June 3, 1930.  J. J. KUTSCHEID  1,761,351
HOLDDOWN FOR SQUARING SHEARS
Filed Jan. 25, 1929   2 Sheets-Sheet 1
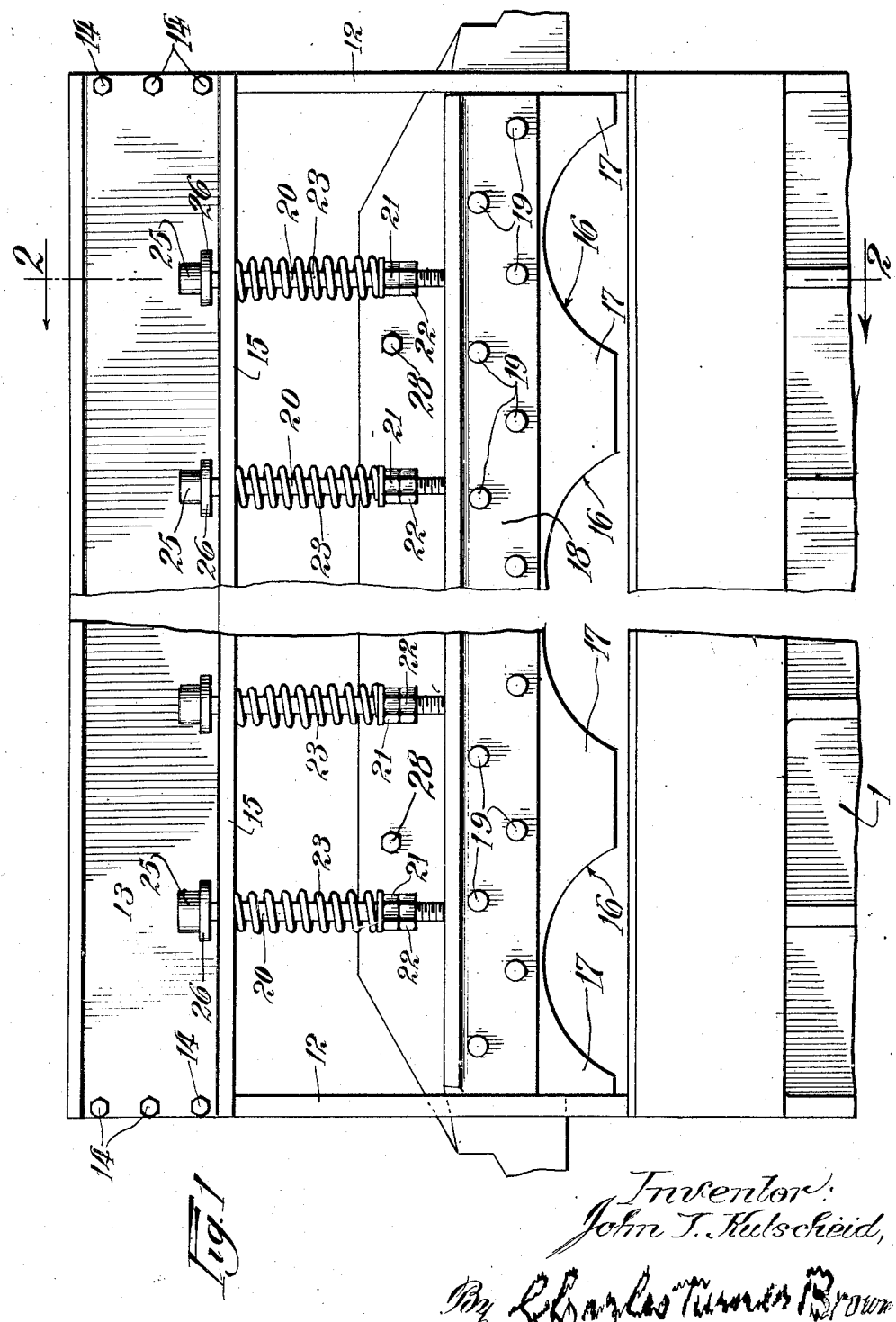

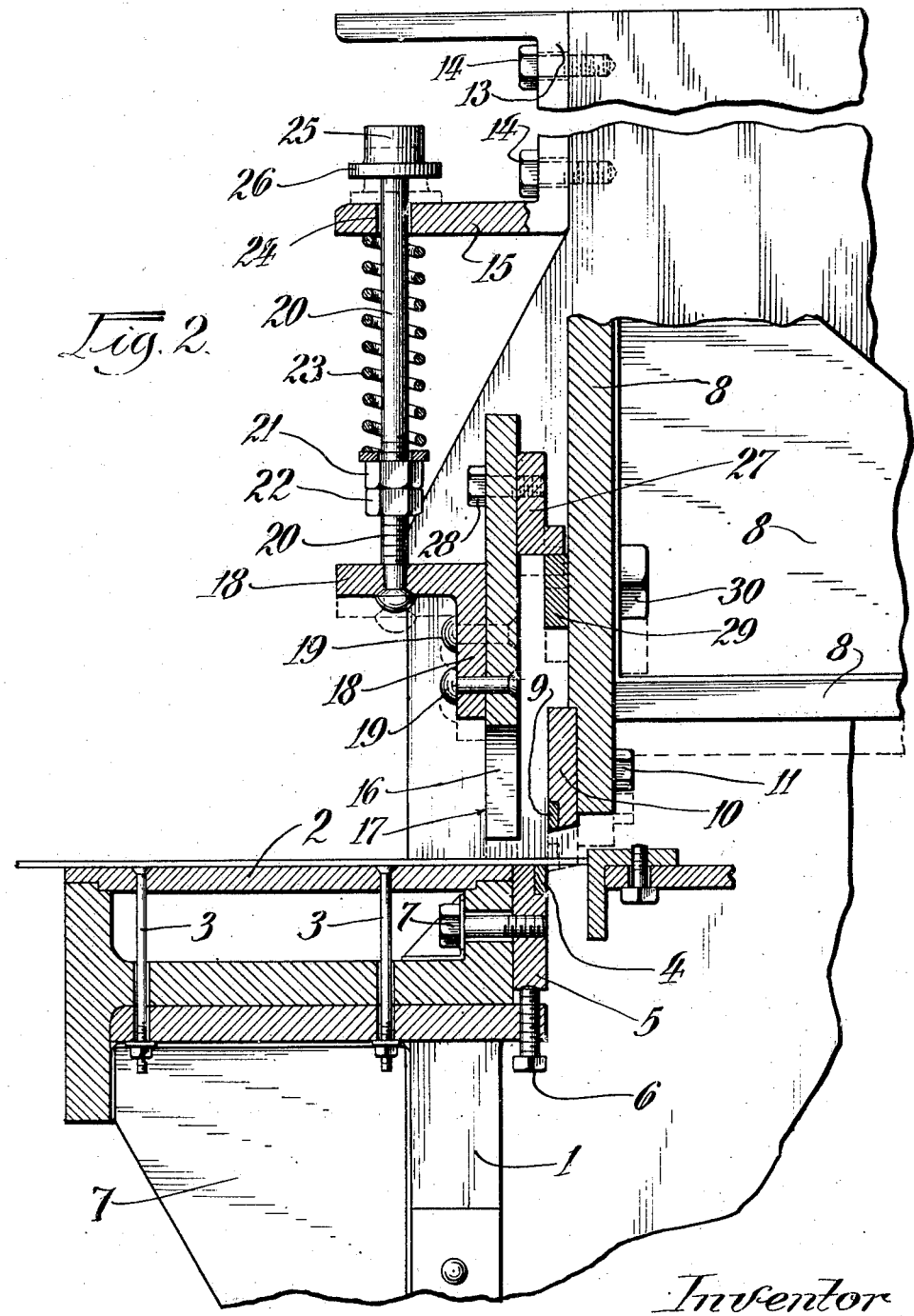

Patented June 3, 1930

1,761,351

UNITED STATES PATENT OFFICE

JOHN J. KUTSCHEID, OF CHICAGO, ILLINOIS, ASSIGNOR TO DREIS & KRUMP MANUFACTURING CO., OF CHICAGO, ILLINOIS, A CORPORATION OF ILLINOIS

HOLDDOWN FOR SQUARING SHEARS

Application filed January 25, 1929. Serial No. 335,022.

This invention relates to means, known in the art as a hold down, to hold a sheet or strip of metal to the table of squaring shears, when said sheet or strip is being cut by the blades of said shears.

Among the objects of the invention is to obtain a hold down which is effective in operation, simple in construction, is durable, not liable to become broken or to get out of order, which is automatic in its operation relative to the movement of the top cutting bar of the shears, and which is economically made.

In the drawings referred to Fig. 1 is a front elevation of the mechanism embodying this invention, showing a portion, in elevation, of the cutting table and base of the shears, the housing, and a portion of the top cutting bar of the shears; and Fig. 2 is a lateral section of the hold down, and associated parts, taken on line 2—2 of Fig. 1, viewed as indicated by arrows.

A reference character applied to designate a given part indicates said part throughout the several figures of the drawings, wherever the same appears.

1 represents the base of the cutting table, and 2 said cutting table. 3 represent bolts by means of which table 2 is secured to base 1. X represents a sheet of metal on table 2. 4, Fig. 2, represents a cutting blade of the shears, which is rigidly secured on bar 5, as by welding, and said bar is adjustably secured in position on base 1 by bolts 6, 7. 8 represents the top cutting bar of the shears. 9 represents the movable blade of the shears, which is rigidly secured, as by welding, to bar 10, and said bar is secured to top cutting bar 8 by bolts 11. 12 represent the ends of the housing of the shears, and 13 a connecting right angle bar, the vertical member whereof is rigidly secured, as by bolts 14, to the ends 12 of the housing. 15 represents the horizontal member of said connecting bar 13. 16 represents a plate of the hold down, the lower edges of members 17 of said plate resting on sheet metal X when said sheet is being cut by blades 4 and 9. 18 represents an angle bar which extends the length of plate 16, and the vertical member of said angle bar is secured to said plate by bolts 19, 20 represent bolts, the lower ends of which are mounted on and secured in the horizontal member of bar 18. 21 represent adjusting nuts on bolts 20, and 22 lock nuts by means of which said nuts 21 are secured in adjusted positions. 23 represent springs on bolts 20. The upper ends of bolts fit loosely in apertures 24 of horizontal member 15. 25 represent the heads of bolts 20, and 26 washers underneath said heads. The nuts 21 are adjusted against the lower ends of springs 23 so as to get a determined pressure by said springs on bar 18, and said pressure determines the pressure of member 17 of bar or plate 16 on metal sheet X, when said sheet is being cut. 27 represent abutments which are secured by bolts 28 to the back face of plate 16, and 29 represent similar abutments which are secured by bolts 30 on the front face of the vertical member of top cutting bar 8. When the top cutting bar 8 and movable blade 9 are in a raised position, as is illustrated in Fig. 2, the abutment 27 rests on abutment 29, and thereby plate 16 is maintained in a raised position, as is illustrated in the drawings, against the resilience of springs 23. When the top cutting bar 8, together with cutting blade 9 is moved downward, the abutments 29, moving down therewith, abutment 27 and plate 16 also move down with said top cutting bar until members 17 of plate 16 rests on the sheet of metal X, holding said sheet of metal to table 2 while the top cutting bar 8 and blade 9 continue to move down and cut a strip off of said sheet X. When the top cutting bar 8 and blade 9 are moved back to their raised and normal position, as is illustrated in Fig. 2, the abutment 27, plate 16, and associated parts, are moved upward into the raised position illustrated in the drawings, by abutment 29.

I claim:

1. In squaring shears comprising ends, a connecting bar joining said ends, said bar provided with a horizontal member, a movable top cutting bar, and a table, in combination, a vertically movable plate, abutments on the rear face of said plate, coacting abutments on said top cutting bar, an angle iron rigidly mounted on said plate, bolts rigidly secured in the horizontal member of said angle iron, said bolts fitting loosely in apertures in the horizontal member of said connecting bar, springs mounted on said bolts and adjusting nuts on said bolts, said plate adapted to be forced downward by the resilience of said springs onto said table 2. In squaring shears comprising ends, a connecting bar joining said ends, said connecting bar provided with a horizontal member, a top cutting bar, and a table, in combination, a vertically movable plate, an angle iron mounted on the face of said plate, bolts secured in the horizontal member of said angle iron, said bolts movable in apertures in the horizontal member of said connecting bar, springs mounted on said bolts, adjusting nuts on said bolts, and means co-acting with said top cutting bar and said plate to raise said plate on the raising of said top cutting bar to its extreme upward position.

JOHN J. KUTSCHEID.